Dec. 13, 1932. M. PILLARD 1,890,747
METHOD OF MAKING HOLLOW METALLIC AIR SCREWS
Filed April 7, 1930
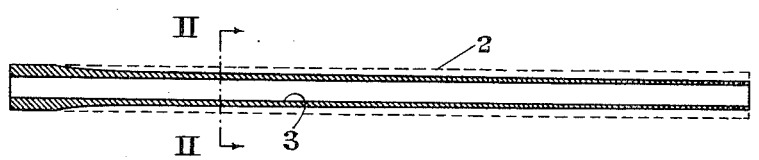
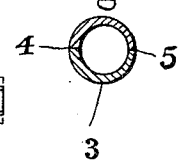
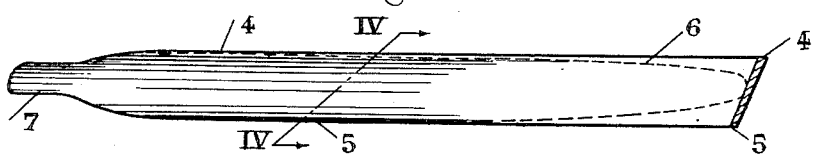
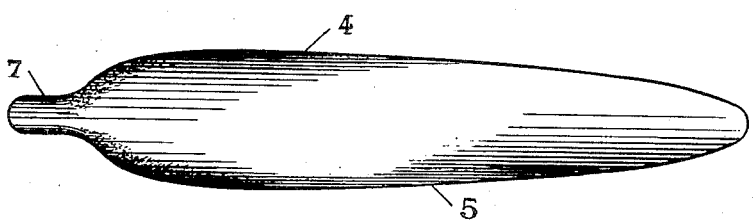
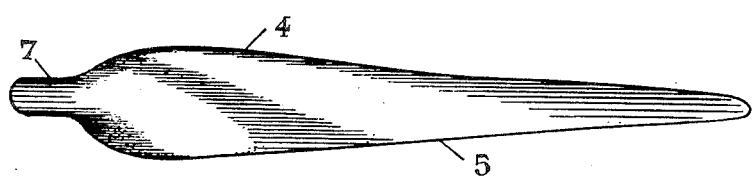

Patented Dec. 13, 1932

1,890,747

UNITED STATES PATENT OFFICE

MARCEL PILLARD, OF MARSEILLE, FRANCE, ASSIGNOR TO L'HELICE METALLIQUE, BREVETS PAULHAN-PILLARD, SOCIETE ANONYME, OF MARSEILLE, FRANCE

METHOD OF MAKING HOLLOW METALLIC AIR SCREWS

Application filed April 7, 1930, Serial No. 442,281, and in France April 19, 1929.

Air screws are subjected to very considerable centrifugal forces owing to their high peripheral velocity. It is therefore essential in the manufacture of air screws to combine great strength with a minimum weight of blade. This condition is fulfilled by blades having uniform strength.

In manufacturing blades of uniform strength, it is necessary to make the thickness of the blade to agree at all points with predetermined values obtained by calculation. These calculations show that the thickness of a blade of uniform strength must vary not only in the longitudinal direction, but also in the transverse direction of the blade.

The present invention relates to an improved method of making hollow metallic blades of uniform strength, which starts from a tubular blank. According to the invention the tubular blank is first worked in such a manner as to vary in the required manner the thickness of the shell of the blank both in the longitudinal and in the transverse direction, and the blank is then cut longitudinally into entirely separate parts. These parts are then cut and shaped by pressing, bending or other suitable process and are finally welded to each other along their edges. In this manner a blade of uniform strength capable of giving the best aerodynamic effect is obtained. The improved method enables in a very simple manner the thickness of the blade to be varied both in the transverse and in the longitudinal direction, in the manner required for obtaining a blade of uniform strength. The parts obtained by cutting the suitably worked tubular blank may be easily cut to the required longitudinal profile and also shaped transversely for instance, by pressing in suitable dies.

The invention may be carried out in the following manner:

A tubular blank is placed in hot condition upon a suitable core or mandrel. It is then machined eccentrically by turning in known manner whereby the thickness of the shell of the blank is varied both peripherally and longitudinally. It will be understood that the blank or the tool, or both the blank and the tool turn during this machining operation about an axis which does not coincide with the axis of the blank. After this operation by which the required variation of the thickness of the shell is obtained, the blank is cut longitudinally into two or more entirely separate parts. These parts are then further cut longitudinally to the required shape and are then pressed in suitable dies to the required shape. Two such parts are then joined by welding along their edges, to form a complete blade. As the parts into which the tubular blank has been longitudinally cut are entirely separate they may very conveniently be handled and worked upon. The required reductions of thickness both in the transverse direction and in the longitudinal direction may be quite accurately obtained by a proper control of the turning operation. If required the blades may be provided with suitable known reinforcing members arranged in their interior in a known way. Any suitable material may be used within the scope of the invention.

A preferred method of carrying out the invention is illustrated in the accompanying drawing, in which:

Fig. 1 shows in longitudinal axial section a blank after it has been turned longitudinally and transversely according to the invention, the form of the blank before the turning operation being indicated by dotted lines, Fig. 2 is a cross section of the said blank after it has been turned as aforesaid, taken on line II—II of Figure 1, Fig. 3 shows in front view one of the two parts into which the turned blank has been cut after it has been flattened by a pressing operation, Fig. 4 is a cross section of the part shown in Fig. 3 and forming one half of the blade the section being taken on line IV—IV of Fig. 3, Fig. 5 shows in cross section two such parts as that illustrated in Fig. 4 after they have been united by welding, Fig. 6 shows a complete blade according to the invention in front elevation, Fig. 7 shows the complete blade as viewed at an angle of 45°, and Fig. 8 shows the complete blade in side view.

Referring to the drawing, the reference numeral 2 (Fig. 1) denotes a tubular blank (shown partly in dotted lines) for the manufacture of an air screw blade.

The said blank is turned, according to the invention, both transversely and longitudinally and is thereby brought into the form indicated by the reference numeral 3 in Fig. 1 and shown in full lines. It will be seen from the cross section of the turned blank shown in Fig. 2 that the tubular blank has been turned eccentrically in such manner that its thickness diminishes from the point marked 4 to the point marked 5. After the blank has been thus turned, it is flattened by pressing in a suitable die and is then cut longitudinally into two parts, one of which is shown in Fig. 3 in perspective, and in Fig. 4 in cross section. The said parts are thereupon cut longitudinally into the shape indicated by the dotted lines 6 in Fig. 3, are pressed in a die to the required profile and are joined together by welding along their longitudinal edges to form the finished blade which is shown in Fig. 5 in cross section, in Fig. 6 in front elevation, in Fig. 7 as viewed at an angle of 45° and in Fig. 8 in side elevation. The small part 7 of the blade illustrated in the drawing serves in the usual manner for the attachment of the blade to the hub of the engine shaft.

I claim:

1. A method of making metallic air screws consisting in first working a tubular blank so as to vary the thickness of the shell both from one end to the other and on any cross section at right angles to the length of the blank, then cutting the blank longitudinally into entirely separate parts, shaping said parts whilst entirely separated from one another and joining two such parts along their edges.

2. A method of making hollow metallic air screws composed of two parts joined together along their edges, comprising heating a tubular blank, mounting same upon a core, machining the blank eccentrically by turning, reducing the thickness to vary the same from one end of the blank to the other, cutting the turned blank longitudinally into a number of parts, trimming the longitudinal edges of the parts to form the parts to the required shape and pressing them in a die to the required shape, and joining by welding two said parts along their longitudinal edges.

In testimony whereof I have affixed my signature.

MARCEL PILLARD.